United States Patent [19]

Anderson

[11] 3,807,171
[45] Apr. 30, 1974

[54] SUPPORTED HIGH-SURFACE-AREA PROPELLANT CHARGES FOR HIGH-ACCELERATION ROCKETS

[75] Inventor: Stanley E. Anderson, Warminster, Pa.

[73] Assignee: The United States of America as represented by the Secretary of the Army, Washington, D.C.

[22] Filed: Apr. 27, 1972

[21] Appl. No.: 249,453

[52] U.S. Cl. .................................. 60/255, 102/102
[51] Int. Cl. ............................................. F02k 9/04
[58] Field of Search .......... 102/101, 102, 103, 49.3; 60/35.6 RS, 255

[56] References Cited
UNITED STATES PATENTS 3,332,353  7/1967  Burkardt et al.................. 102/99 X
3,159,104  12/1964  Hodgson............................. 102/101
3,032,437  5/1962  Pitchford......................... 102/102 X Primary Examiner—Robert F. Stahl
Attorney, Agent, or Firm—Edward J. Kelly; Herbert Berl; James T. Deaton

[57] ABSTRACT

A high-acceleration rocket motor in which the propellant is bonded to supporting structure in a thin and substantially uniform layer to enable the propellant to withstand high acceleration forces. High-surface-area propellant is accomplished by the shape of the supporting structure.

6 Claims, 3 Drawing Figures

PATENTED APR 30 1974  3,807,171

SUPPORTED HIGH-SURFACE-AREA PROPELLANT CHARGES FOR HIGH-ACCELERATION ROCKETS

BACKGROUND OF THE INVENTION

High-surface-area propellant charges for high-acceleration rockets have been made from high-strength propellants in the form of tubes supported at the head end or aft end or in the form of stacked wafers. Structural support in the form of metal foil has been marginally successful. Most of the propellants which have been used in high-acceleration rockets are of low performance or have shortcomings in important ballistic properties such as sensitivity to temperature when compared with state-of-the-art, high-energy propellants. Future rockets will have accelerations such that even the currently used high-strength propellants will not be structurally adequate, and the state-of-the-art high-performance case-bondable propellants will be woefully lacking in strength for such applications.

Therefore, it is an object of this invention to provide suitable support means that will allow the use of high-performance, moderate-strength propellant in a rocket motor that is designed for high acceleration.

A further object of this invention is to provide a structurally supported propellant in which substantial increases in performance, reproducibility, and reductions in temperature effects can be appreciated.

SUMMARY OF THE INVENTION

In accordance with this invention, a high-acceleration rocket motor is provided in which high-surface-area burning propellant is supported on and bonded in a substantially uniform layer form on fins that radiate from a central core. The rocket motor may also have a thin layer of propellant around the inner surface of the motor case in order to increase the burning area of the propellant.

DESCRIPTION OF THE PREFERRED EMBODIMENT

Figure 1:
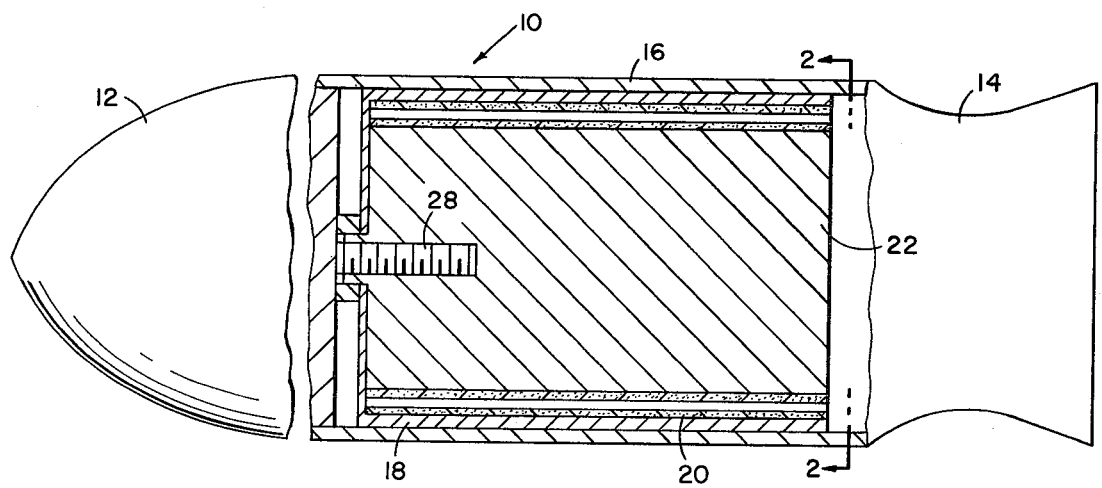
FIG. 1 is a rocket partially in section along line 1—1 of FIG. 2 and illustrating the rocket motor according to this invention.

Referring now to FIG. 1, rocket 10 is illustrated that has a forward nose cone portion 12 and a rear nozzle section 14. Between nose cone sections 12 and 14, there is a rocket motor section 16. Rocket motor section 16 contains a motor case 18 with a thin layer of propellant 20 around the inner periphery thereof and a center supported structure 22 that has a plurality of uniform thickness radiating fins 24 (see FIG. 2) that radiate outwardly to support a substantially uniform layer of propellant 26 thereon. Support structure 22 is secured to motor case 18 in a conventional manner such as by bolt 28. Motor case 18 is secured in housing 16 in a conventional manner. Solid propellant 26 is ignited by a conventional igniter (not shown) and normally placed at the forward end of the motor case.

Figure 3:
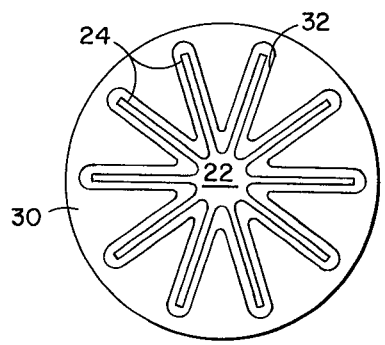
FIG. 3 is a top view illustrating the support structure of the rocket motor and a casting housing that is utilized for casting the solid propellant around the support structure.
Figure 2:
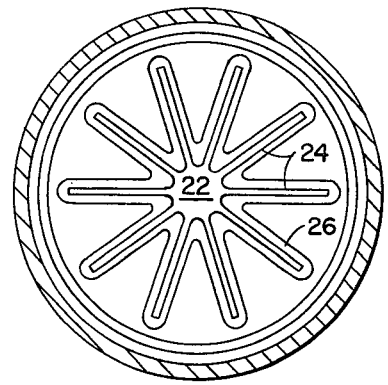
FIG. 2 is a view taken along line 2—2 of FIG. 1.

Supporting structure 22 of FIG. 2 is illustrated as having ten radiating fins 24, but the supporting structure may have from approximately eight to 12 fins for supporting the propellant thereon. Supporting fins 24 are uniformly spaced about the center supporting structure 22 and have a uniform thickness that may range from about 0.030 of an inch to about 0.070 of an inch. Each fin 24 should have the outer surface thereof roughened in order to enable the solid propellant to adhere better to the supporting structure. Solid propellant 20 is applied in substantially uniform thickness layer about motor case 18 and fins 24 of supporting structure 22 in a layer of approximately 0.030 of an inch to about 0.100 of an inch or greater. Solid propellant 20 is cast in housing 18 in a conventional manner and solid propellant 26 is cast about supporting structure 22 and fins 34 by supporting structure 22 being placed in a mold 30 (see FIG. 3) and casting of the propellant in the space between fins 24 and inner surface 32 of mold 30. Prior to casting of the propellant around fins 24, surface 32 of mold 30 is coated with a conventional commercial release agent of the silicone type. This aids in removal of the supporting structure with the solid propellant thereon from mold 30. Mold 30 may be a composition of lead-bismuth. Support structure 22 and fins 24 thereon are cleaned by conventional cleaning methods prior to propellant 26 being cast thereon.

Solid propellant 26 has a binder which is composed of functionally terminated polybutadienes such as carboxy terminated polybutadiene, hydroxy terminated polybutadiene and etc. The propellant composition also contains an oxidizer such as ammonium perchlorate, a fuel such as aluminum, burning rate additives, a crosslinking agent and other additives such as processing aids as desired. When the propellant is cast onto housing 18 or supporting fins 24 of support structure 22, the binder and other propellant ingredients are bonded to the support structure without the need for additional bonding agents. That is, the binder adheres sufficiently to supporting fins 24 to hold the propellant relative to fins 24.

Support structure 22 extends the full length of the supported grain and the propellant coats all surfaces uniformly except for the ends. Test motors using this grain support system have been fired successfully in both static and flight conditions at temperatures from −40°F to +140°F. The grain support system has operated successfully under acceleration load of 12,000 g's. In a rocket motor that weights 3 pounds, support structure 22 adds only 0.18 pounds to the weight of the rocket motor when fin structure 24 is approximately 0.030 of an inch. Support structure 22 can be made as aluminum extrusions.

In operation, motor 16 is ignited by a conventional igniter to cause the exposed surfaces of propellant 26 to burn toward the supporting structures for the propellant. Since the exposed surface of the propellant is very great, a high thrust or high mass discharge rate motor is produced.

I claim:

1. A rocket motor comprising a motor case that has a chamber therein, said motor case having an end wall at a forward end of said motor case and an open end opposite said end wall; a solid support structure mounted in said motor case by being secured at said end wall to said motor case, said support structure extending the full length of said motor case, said support structure having a plurality of radiating fins that are integral with, uniformly spaced about the support structure, and extend the full length of the support structure; and a substantially uniform thickness layer of propellant on the outer surfaces of said fins and the exposed surfaces on said support structure between said fins to provide a continuous and uninterrupted propellant layer that is structurally supported and has a high-surface-area.

2. A rocket motor as set forth in claim 1, wherein said support structure has from 8 to 12 radiating fins of a thickness from about 30 to about 70 thousandths of an inch thick, and wherein said solid propellant layer is about 30 to about 100 thousandths of an inch thick.

3. A rocket motor as set forth in claim 2, wherein said motor case has a substantially uniform thickness layer of propellant about the inner surface of said motor case.

4. A rocket motor as set forth in claim 3, wherein said propellant about the inner surface of said motor case has substantially the same thickness as the propellant about said fins.

5. A rocket motor as set forth in claim 4, wherein said fins are 10 in number and have a thickness of 30 to 60 thousandths of an inch.

6. A rocket motor as set forth in claim 5, wherein said propellant about said fins is approximately 30 to 60 thousandths of an inch thick, and the propellant about said inner surface is approximately 30 to 60 thousandths of an inch thick.

* * * * *